US011755723B2

(12) United States Patent
Dai et al.

(10) Patent No.: US 11,755,723 B2
(45) Date of Patent: Sep. 12, 2023

(54) DEVICE AND METHOD FOR VALIDATION OF VIRTUAL FUNCTION POINTERS (71) Applicant: Huawei Technologies Co., Ltd., Shenzhen (CN)

(72) Inventors: Ting Dai, Singapore (SG); Yongzheng Wu, Singapore (SG); Tieyan Li, Singapore (SG)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 357 days.

(21) Appl. No.: 17/237,388

(22) Filed: Apr. 22, 2021

(65) Prior Publication Data

US 2021/0240820 A1 Aug. 5, 2021

Related U.S. Application Data (63) Continuation of application No. PCT/CN2018/111412, filed on Oct. 23, 2018.

(51) Int. Cl.
G06F 21/00 (2013.01)
G06F 21/54 (2013.01)
G06F 8/41 (2018.01)

(52) U.S. Cl.
CPC ............... G06F 21/54 (2013.01); G06F 8/41 (2013.01); G06F 2221/033 (2013.01)

(58) Field of Classification Search
None
See application file for complete search history.

(56) References Cited

U.S. PATENT DOCUMENTS 8,745,741 B1    6/2014  Tice et al.
11,550,903 B1*  1/2023  Epstein ............... G06F 21/577
(Continued)

FOREIGN PATENT DOCUMENTS

CN   103324872 A    9/2013
CN   105868641 A    8/2016
CN   106126981 A   11/2016

OTHER PUBLICATIONS

Bando, Masanori et al. Range hash for regular expression pre-filtering. 2010 ACM/IEEE Symposium on Architectures for Networking and Communications Systems (ANCS). https://ieeexplore.ieee.org/stamp/stamp.jsp?tp=&arnumber=5623834 (Year: 2010).*

(Continued)

Primary Examiner — Jeremiah L Avery
(74) Attorney, Agent, or Firm — Conley Rose, P.C.

(57) ABSTRACT

A method for validation of virtual function pointers includes compiling a source code file with one or more classes whereby each of the classes has a virtual table, and the compiling includes associating a security check function with the virtual function invocation site such that the associated security check function is executed prior to an invocation of the virtual function, generating a class hierarchy hash table (CHHT), whereby when the compiled source code file is executed, the security check function is used to determine whether an invoked virtual function pointer of a virtual function associated with the security check function is valid by looking up an indicator in the CHHT according to a hash result of the virtual function pointer and an address of a virtual table containing the virtual function pointer.

20 Claims, 5 Drawing Sheets

(56) References Cited

U.S. PATENT DOCUMENTS

| | | | |
|---|---|---|---|
| 2012/0117551 A1 | 5/2012 | Isard et al. | |
| 2012/0144480 A1 | 6/2012 | Miller et al. | |
| 2012/0246487 A1 | 9/2012 | Gu et al. | |
| 2015/0082399 A1* | 3/2015 | Wu | H04L 9/0897 |
| | | | 726/10 |
| 2015/0356294 A1* | 12/2015 | Tan | G06F 21/53 |
| | | | 726/22 |
| 2017/0103210 A1* | 4/2017 | Baji-Gál | G06F 21/52 |

OTHER PUBLICATIONS

Phang, Khoo Yit et al. Expositor: Scriptable time-travel debugging with first-class traces. 2013 35th International Conference on Software Engineering (ICSE). https://ieeexplore.ieee.org/stamp/stamp.jsp?tp=&arnumber=6606581 (Year: 2013).*

Schuster, F., et al., "Counterfeit Object-oriented Programming On the Difficulty of Preventing Code Reuse Attacks in C++ Applications," IEEE Symposium on Security and Privacy, May 2015, 18 pages.

Bairagi, D., et al., "Precise Call Graph Construction for OO Programs in the Presence of Virtual Functions," ICPP 97: Proceedings of the international Conference on Parallel Processing, Aug. 11-15, 1997, 5 pages.

Jang, D., et al., "Safedispatch: Securing C++ Virtual Calls from Memory Corruption Attacks," Feb. 23-26, 2014, 15 pages.

Tice, C., et al., "Enforcing Forward-Edge Control-Flow Integrity in GCC and LLVM," Usenix Association, 23rd Usenix Security Symposium, Aug. 20-22, 2014, San Diego, CA, 16 pages.

Zhu, W., "Defending Against Code Reuse Attack with Class Hierarchy," Nanjing University, 2016, Issue 10, 2 pages.

Zou, Z., "Fine-grained Defense Against Vtable Hijacking Attack Based on GCC," Nanjing University, 2018, Issue 04, 2 pages.

* cited by examiner

DEVICE AND METHOD FOR VALIDATION OF VIRTUAL FUNCTION POINTERS

CROSS-REFERENCE TO RELATED APPLICATIONS

This application is a continuation of International Patent Application No. PCT/CN2018/111412 filed on Oct. 23, 2018, which is hereby incorporated by reference in its entirety.

TECHNICAL FIELD

This disclosure relates to a device and method for a device to validate virtual function pointers in an application executed on the device.

BACKGROUND

Most software applications are vulnerable to malicious attacks that attempt to alter or change the behaviour of the software application by changing the control flow of the application. Typically, such attacks occur when the software application receives and executes malicious binary code received over regular communication channels. Once executed, the malicious binary codes then alter the application's program flow by exploiting pre-existing software flaws contained within the application. Through the exploitation of such flaws, malicious attackers may then subvert the application. Once the application has been subverted, the malicious attackers will then gain control over the software applications behaviour without the knowledge of the original user.

In particular, worms or viruses may insert themselves into an execution flow of the software application. Once this occurs, the flow from the software-planned course may then be diverted to a course dictated by the worm or the virus. If the software application has a vulnerability that exists at the machine code level, the attack by the worm or the virus may cause the diversion of the execution of software machine code, leading to the execution of an unanticipated sequence of machine code instructions.

Another method that has been utilized by malicious parties is the counterfeit object-oriented programming (COOP) attack method which diverts a program from its normal program flow by exploiting C++ program vulnerabilities. Such attacks will typically utilize virtual function gadgets to achieve arbitrary code execution on the victim's program. In a COOP attack, the attacker redirects a function call to another unintended function, by faking additional virtual function tables or by reusing other existing virtual function tables found in the software application. These kinds of attacks alter the virtual function tables or even virtual functions to affect the normal control-flow of the execution of the program.

Those skilled in the art have attempted to address this problem by reducing or attempting to reduce as many flaws or vulnerabilities in software coding as possible. A downside with such an approach is that it is very difficult for all flaws in a piece of software to be thoroughly and completely eliminated. Other mitigation approaches depend on computer systems independently picking random integers from a large set, and attempting to surround important information or flow data (that an attacker may want to modify) with those random values—such that the attacker must, for a successful attack, make use of the actual values chosen. These approaches cannot guarantee that the attacker will not learn the chosen values, and may be ineffective if an attacker learns or successfully guesses the chosen value. More broadly, such approaches will unlikely prevent attacks that cause a device's memory to be altered.

Another approach that has been adopted to circumvent COOP attacks is to protect virtual function tables contained within software based applications when the software application is being compiled. In particular, when the software application is being compiled, certain security checks are inserted into the program binary where virtual function calls happen. The compiler based methods focus on ensuring that the correct virtual function table is used with different types of security granularities. Hence, even if the attacker is able to redirect virtual function table pointers to other virtual function tables, the virtual function call will only be able to call legal targets with security constraints, instead of arbitrary code in a software application. In this manner, the attacker's attacks would be severely limited hence mitigating or even preventing the attacks.

Therefore, although existing solutions may limit the amount of damage that may be caused by an attacker, existing solutions still render a software application vulnerable to attacks from viruses, worms, and other attacks. Existing solutions still cause the performance of the attacked software applications to suffer as the redirection of valid function calls may still occur and attackers may still cause other functions to be executed.

For the above reasons, those skilled in the art are constantly striving to come up with a device and method to reinforce control flow integrity of software applications.

SUMMARY

Devices and methods to improve the verification and validation of virtual function tables in software applications are set out below in accordance with embodiments of the disclosure.

A first improvement proposed by embodiments of devices and methods in accordance with the disclosure is that the C++ program class hierarchy can be summarized and securely stored within the class hierarchy hash table (CHHT) and as the information comprises hashes and their positive or negative indicators, the amount of space required is minimized.

A second improvement proposed by embodiments of devices and methods in accordance with the disclosure is the CHET's security level may be customized according to the needs and requirements of users.

A third improvement proposed by embodiments of devices and methods in accordance with the disclosure is that the disclosure allows for the security checks to be performed smoothly as the binary file is executed.

The above improvements are provided by embodiments of a device in accordance with the disclosure operating in the following manner.

According to a first aspect of the disclosure, a device is disclosed, the device comprising at least one processor, and a non-transitory media readable by the at least one processor, the non-transitory media storing instructions that when executed by the at least one processor, cause the at least one processor to compile a source code file, the source code file comprising one or more classes whereby each of the classes has a virtual table containing at least one virtual function pointer that is pointing to a virtual function, a virtual function invocation site associating with a virtual function in one of the classes, the compiling comprises associating a security check function with the virtual function invocation site such that the associated security check function is executed prior to an invocation of the virtual function, generating a CHHT whereby the generating comprises hashing, for each class, an address of the virtual table with each virtual function pointer contained in the virtual table to produce a hash result for each of the virtual function pointers and associating each of the hash results with an indicator, and populating the CHHT with the hash results and their associated indicators.

In embodiments of the disclosure, the associated indicators may comprise positive indicators such as a "1" numeral.

With reference to the first aspect, the compiled source code is configured to execute the security check function to determine whether an invoked virtual function pointer associated with the security check function is valid by comparing a hash result of the invoked virtual function pointer and an address of a virtual table containing the invoked virtual function pointer with results in the CHHT.

With reference to the first aspect, the compiling the source code file further comprises instructions for directing the at least one processor to: compute a total number of entries in the CHHT whereby the total is defined as Total=n·log n×SP when SP<(n·m/log n) or as Total=n·n·m when SP>(n·m/log n), where n is the total number of the one or more classes, m is an average number of virtual functions in the one or more classes and SP is a security parameter of the one or more classes, and populate the CHHT with initial hashes such that a number of entries in the CHHT equals the computed total number of entries, Total, whereby each initial hash is associated with an initial indicator. In embodiments of the disclosure, the other type of indicator may comprise a negative indicator such as a "0" numeral. In embodiments of the disclosure, the security parameter (SP) is defined based on security and space consumptions of the CHHT.

With reference to the first aspect, the compiling the source code file further comprises instructions for directing the at least one processor to relocate addresses of virtual tables associated with each virtual function to a specific memory range.

With reference to the first aspect, each of the security check functions is further configured to determine whether an invoked virtual function pointer associated with each of the security check functions is valid by comparing an address of a virtual table containing the invoked virtual function pointer with addresses stored in the specific memory range.

With reference to the first aspect, the virtual tables and the CHHT are stored in a protected non-transitory media readable by the at least one processor.

According to a second aspect of the disclosure, a method is disclosed, the method comprises compiling a source code file, the source code file comprising one or more classes whereby each of the classes has a virtual table containing at least one virtual function pointer that is pointing to a virtual function, a virtual function invocation site associating with a virtual function in one of the classes, the compiling comprises associating a security check function with the virtual function invocation site such that the associated security check function is executed prior to an invocation of the virtual function, generating a CHHT whereby the generating comprises hashing, for each class, an address of the virtual table with each virtual function pointer contained in the virtual table to produce a hash result for each of the virtual function pointers and associating each of the hash results with an indicator, and populating the CHHT with the hash results and their associated indicators. In embodiments of the disclosure, the associated indicators may comprise positive indicators such as a "1" numeral.

With reference to the second aspect, the security check function is configured to determine whether a virtual function pointer of a virtual function associated with the security check function is valid by looking up an indicator in the CHHT according to a hash result of the virtual function pointer of the virtual function and an address of a virtual table containing the virtual function pointer.

With reference to the second aspect, the compiling the source code file further comprises: computing a total number of entries in the CHHT whereby the total is defined as Total=n·log n×SP when SP<(n·m/log n) or as Total=n·n·m when SP>(n·m/log n), where n is the total number of the one or more classes, m is an average number of virtual functions in the one or more classes and SP is a security parameter of the one or more classes, and populate the CHHT with initial hashes and initial indicators. In embodiments of the disclosure, the other type of indicator may comprise a negative indicator such as a "0" numeral. In embodiments of the disclosure, the security parameter SP is defined based on security and space consumptions of the CHHT.

With reference to the second aspect, the compiling the source code file further comprises relocating addresses of virtual tables associated with each virtual function to a specific memory range.

With reference to the second aspect, each of the security check functions is further configured to determine whether an invoked virtual function pointer associated with each of the security check functions is valid by comparing an address of a virtual table containing the invoked virtual function pointer with addresses stored in the specific memory range.

With reference to the second aspect, the virtual tables and the CHHT are stored in a protected non-transitory media readable by at least one processor in the device.

According to a third aspect of the disclosure, a device is disclosed, the device comprising at least one processor, a non-transitory media readable by the at least one processor, the non-transitory media storing instructions having one or more classes, whereby each of the classes has a virtual table containing at least one virtual function pointer that is pointing to a virtual function, the at least one processor executed the instructions to detect a virtual function invocation site associating with a virtual function in one of the classes, execute a security check function to determine whether a virtual function pointer of the virtual function is valid by looking up an indicator in a CHHT according to a hash result of the virtual function pointer of the virtual function and an address of a virtual table containing the virtual function pointer, the CHHT comprising hash results and their associated indicators, the hash results being generated for each classes by hashing an address of a virtual table with each virtual function pointer contained in the virtual table to produce a hash result for each of the virtual function pointers and associating each of the hash results with their indicator. In embodiments of the disclosure, the associated indicators may comprise positive indicators such as a "1" numeral.

With reference to the third aspect, the CHHT further comprises a number of random hashes that are each associated with another type of indicator whereby a total summation of the number of random hashes and the hash results in the CHHT is given by: Total=n·log n×SP when SP<(n·m/log n) or as Total=n·n·m when SP>(n·m/log n), where n is a total number of the classes that are linked, m is an average number of virtual functions in the classes and SP is a security parameter of the classes. In embodiments of the disclosure, the other type of indicator may comprise a negative indicator such as a "0" numeral.

With reference to the third aspect, the addresses of virtual tables associated with each virtual function are relocated to a specific memory range.

With reference to the third aspect, each of the security check functions is further configured to determine whether an invoked virtual function pointer associated with each of the security check functions is valid by comparing an address of a virtual table containing the invoked virtual function pointer with addresses stored in the specific memory range.

With reference to the third aspect, the virtual tables and the CHHT are stored in a protected non-transitory media readable by the at least one processor.

According to a fourth aspect of the disclosure, a method is disclosed, the method comprising detecting, at an execution time, a virtual function invocation site associating with a virtual function in a compiled file, the compiled file has one or more classes whereby each of the classes has a virtual table containing at least one virtual function pointer that is pointing to a virtual function, executing a security check function to determine whether an virtual function pointer of the virtual function is valid by looking up an indicator in a CHHT according to a hash result of the virtual function pointer of the virtual function and an address of a virtual table containing the virtual function pointer, the CHHT comprising hash results and their associated indicators, the hash results being generated for each classes by hashing an address of a virtual table with each virtual function pointer contained in the virtual table to produce a hash result for each of the virtual function pointers and associating each of the hash results with their indicator. In embodiments of the disclosure, the associated indicators may comprise positive indicators such as a "1" numeral.

With reference to the fourth aspect, the CHHT further comprises a number of random hashes that are each associated with another type of indicator whereby a total summation of the number of random hashes and the hash results in the CHHT is given by: Total=n·log n×SP when SP<(n·m/log n) or as Total=n·n·m when SP>(n·m/log n), where n is a total number of the classes that are linked, m is an average number of virtual functions in the classes and SP is a security parameter of the classes. In embodiments of the disclosure, the other type of indicator may comprise a negative indicator such as a "0" numeral.

With reference to the fourth aspect, the addresses of virtual tables associated with each virtual function are relocated to a specific memory range.

With reference to the fourth aspect, each of the security check functions is further configured to determine whether an invoked virtual function pointer associated with each of the security check functions is valid by comparing an address of a virtual table containing the invoked virtual function pointer with addresses stored in the specific memory range.

With reference to the fourth aspect, the virtual tables and the CHHT are stored in a protected non-transitory media readable by at least one processor in the device.

According to a fifth aspect of the disclosure, a device for validating virtual functions in an object orientated software application is disclosed, the device comprising a processor, and a non-transitory media readable by the processor, the non-transitory media storing instructions that when executed by the processor, cause the processor to compile a source code file, the source code file comprising one or more classes whereby each of the classes has a virtual table containing at least one virtual function pointer that is pointing to a virtual function, a virtual function invocation site associating with a virtual function in one of the classes, the compiling comprises associating a security check function with the virtual function invocation site such that the associated security check function is executed prior to an invocation of the virtual function, generating a CHHT whereby the generating comprises hashing, for each class, an address of the virtual table with each virtual function pointer contained in the virtual table to produce a hash result for each of the virtual function pointers and associating each of the hash results with an indicator, and populating the CHHT with the hash results and their associated indicators, execute the binary file, whereby prior to the invocation of each virtual function, an associated security check function is executed to hash an address of an associated virtual table with a virtual function pointer that points to a virtual function that is to be invoked and the security check function validates the virtual function when it is determined that the hash result matches with a hash result having a positive indicator in the CHHT. It should be noted that when the associated security check function determines that the hash result does not match with a hash result having a positive indicator in the CHHT, the virtual function will not be validated and as such, will not be invoked by the processor. In embodiments of the disclosure the positive indicator may comprise a numeral such as "1".

BRIEF DESCRIPTION OF THE DRAWINGS

The above advantages and features in accordance with this disclosure are described in the following detailed description and are shown in the following drawings.

DESCRIPTION OF EMBODIMENTS

This disclosure relates to a device and method for a device to validate virtual function calls in a software application as the application is being executed on the device.

In particular, when a compiler compiles a source code file for the software application whereby the source code file comprises at least two classes that each has at least one virtual function and are linked through a class hierarchy, the disclosure will generate a CHHT based on the class hierarchy of these classes. The class hierarchy may comprise, but is not limited to, C++ class hierarchies or any other programming language based on object oriented programming models. The CHHT comprises hashes of all pairs of classes that have a direct inheritance relationship based on the class hierarchy whereby the hash of each of the pairs of classes is associated with a positive indicator. During the compilation of the source code, a security check function will also be associated with each virtual function whereby each associated security check function will be executed prior to the execution of the virtual function. When the binary file is executed and when a security check function is called, the security check function will hash virtual table pointers associated with the virtual function and validates virtual tables associated with the virtual table pointers when it is determined that the hash of the virtual table pointers match with a hash associated with a positive indicator in the CHHT. It should be noted that the term program and software application may be used interchangeably throughout the description without departing from the disclosure.

One skilled in the art will recognize that many functional units in this description have been labelled as modules throughout the specification. The person skilled in the art will also recognize that a module may be implemented as electronic circuits, logic chips or any combination of electrical and/or electronic discrete components within a device. Further, one skilled in the art will also recognize that a module may be implemented in software which may then be executed by a variety of processors. In embodiments of the disclosure, a module may also comprise computer instructions or executable code that may instruct a computer processor to carry out a sequence of events based on instructions received. The choice of the implementation of the modules is left as a design choice to a person skilled in the art and does not limit the scope of this disclosure in any way.

As understood by those skilled in the art, when the code of a software application is compiled, this causes the code to be translated to machine code which is then executed directly by a processor or a virtual machine. In embodiments of the disclosure, this machine code may comprise binary code which is stored in the device's memory.

Figure 1A:
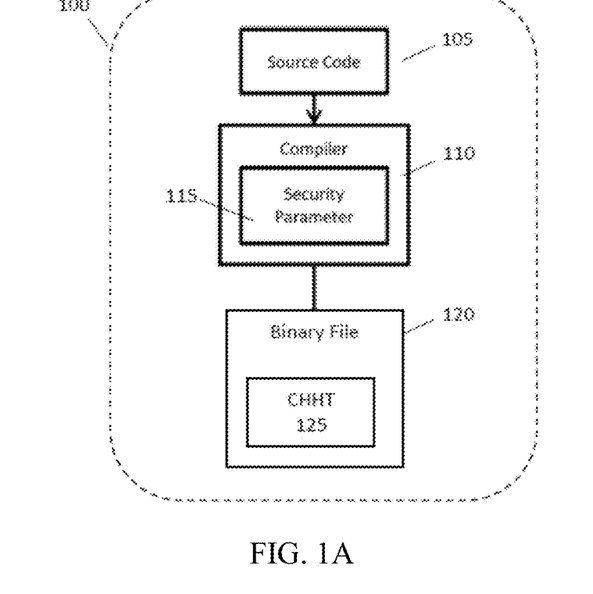
FIG. 1A illustrates an exemplary block diagram of a system representative of modules to compile a source code file having hierarchically linked classes comprising at least one class that has a virtual function table whereby a CHHT is generated based on the hierarchically linked classes in accordance with embodiments of the disclosure during the compilation of the source code file.

FIG. 1A illustrates an exemplary block diagram of modules contained within a system to support the validation or verification of virtual function tables in software applications in accordance with embodiments of the disclosure. The system illustrated in FIG. 1A includes a device 100 that is configured to receive source codes from various sources. Device 100 may comprise, but is not limited to, any device that is able to carry out computing functions either wirelessly or through wired connections such as servers, computers, tablet computers, mobile computers, or netbooks or any type of computing devices that may be configured to receive and execute instructions. These devices are also provided with a variety of modules for carrying out the various computing and processing functions.

In general, device 100 is provided with compiler module 110. Compiler module 110 is configured to receive source code 105 and to compile source code 105 to produce binary file 120. Binary file 120 is then stored in a memory of device 100 where it is then later executed by device 100.

In embodiments of the disclosure, device 100 may also be provided with a development module (not shown) that is operable to provide an integrated development environment (IDE) for development of software applications. The development module may be configured to support the design, development, testing, and/or deployment of software applications within device 100. The development module is also configured to support different programming languages and to integrate different modules to simplify the development of software applications. Further, the development module is also configured such that a developer may create and edit source code for a project and compile the source code to execute a software application.

Device 100 may be a physical device and optionally may comprise a combination of several devices whereby each device may have one or more processors. These one or more processors may then function independently or together to execute instructions stored in a non-transitory media. Device 100 may then be configured to wirelessly communicate with other devices or external sources through the Internet or wireless networks such as, but are not limited to, cellular networks, satellite networks, telecommunication networks, or wide area networks (WANs). Communications between device 100 and other external devices may also take place via wired means. Through these communications means, external users may remotely access modules contained within device 100 to carry out development of software applications or to securely run software applications contained within device 100.

As illustrated in FIG. 1A, device 100 comprises modules that are utilized during the compilation of the source code 105 of a software application that has been loaded into device 100. In operation, source code 105 is first provided to compiler module 110. It should be noted that source code 105 includes at least two classes whereby one of these classes contains at least one virtual function whereby these classes are linked through a class hierarchy or an inheritance tree that inter-relates the various classes.

It should be noted that in embodiments of the disclosure, a security parameter 115 may also be inserted by compiler module 110 into the source code at this stage. The security parameter (SP) 115 may be used to compute a total number of entries in the CHHT whereby a total is defined as:

$$\text{Total}=n\cdot\log n\times SP \text{ when } SP<(n\cdot m/\log n); \text{ or} \qquad \text{equation 1(a)}$$

$$\text{Total}=n\cdot n\cdot m \text{ when } SP>(n\cdot m/\log n) \qquad \text{equation 1(b)}$$

where n is the total number of the plurality of classes linked through the class hierarchy, m is an average number of virtual functions in the plurality of classes and SP is a security parameter of the plurality of classes. The security parameter comprises a numeric value that indicates the security and space consumptions of the CHHT. In embodiments of the disclosure, the default value of SP 115 is defined as 100 for a CHHT that is accorded a medium security level while the value of SP is increased as the security level of the CHHT increases accordingly.

The compiler 110 then proceeds to compile source code 105 and optionally, SP 115, to produce binary file 120 which contains the CHHT 125.

During the compilation process, compiler 110 will insert a pointer known as a virtual table pointer into each class of source code 105 that has a virtual function. In object oriented programming, a virtual function refers to a function that has been inherited from a base class (whereby the function is identified as the base function in the base class). At the same time, compiler 110 will create a virtual pointer table (virtual table) for the class that is associated with the virtual function. The virtual table pointer created for the class will point to the address of the class's virtual table and the virtual table for the class will comprise an array of virtual function pointers that are each pointing to a virtual function. Hence, during runtime, right before a virtual function is invoked, the virtual table pointer will be dereferenced to a virtual table that contains a virtual function pointer that in turn points to the virtual function. The process flow is best described with reference to FIG. 2.

Figure 2:
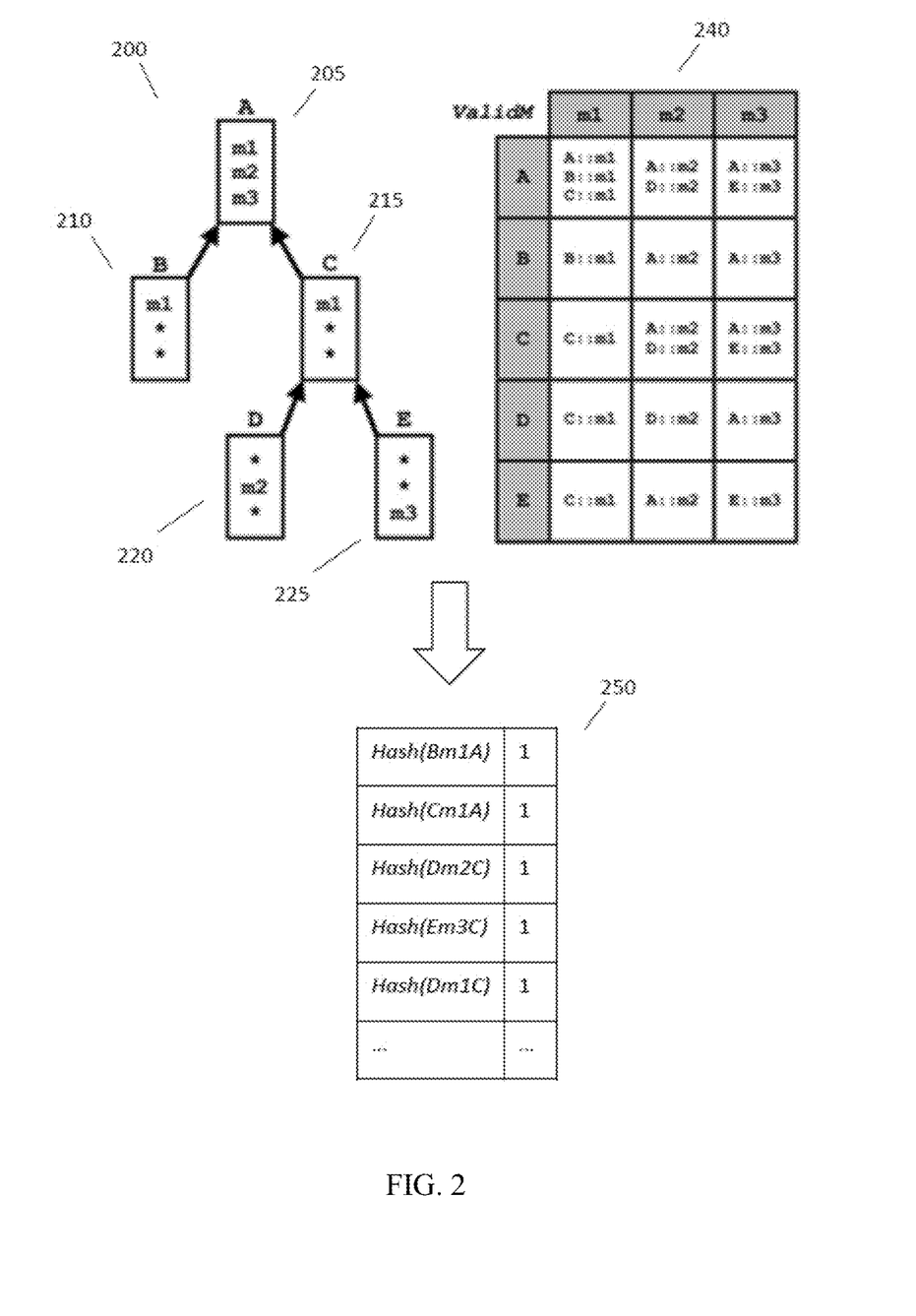
FIG. 2 illustrates a flow diagram showing a process that is performed by a device during compilation of a source code in accordance with embodiments of the disclosure.

An exemplary class hierarchy or inheritance tree structure is illustrated in FIG. 2 as structure 200. Structure 200 comprises a base class and four virtual tables that reference base functions from the base class. Base Class A 205, Table B 210 which is a virtual table associated with Class B, Table C 215 which is a virtual table associated with Class C, Table D 220 which is a virtual table associated with Class D, and Table E 225 which is a virtual table associated with Class E, where Class A is the base class from which Tables B-E inherits functions m1-m3. Although structure 200 only illustrates one base class and four virtual tables, one skilled in the art will recognize that structure 200 may comprise of any number of base classes and their virtual tables linked through various hierarchical arrangements without departing from this disclosure. As shown, it can be seen that Base Class A comprises three base functions m1, m2 and m3 which are referenced to by the respective virtual function pointers while Table B and Table C which are descendants of Class A comprises virtual function pointer m1, Table D which is a descendant of Table C comprises virtual function pointer m2 and Table E which is a descendant of Table C comprises virtual function pointer m3.

Hence, during runtime, when virtual function m1 is called in Class B, a virtual table pointer to Virtual Table B will be first invoked. A virtual function pointer (contained in Table B) to base function m1 in Base Class A (which is a descendant of Base Class A which contains base function m2) will then be invoked.

Table 240 which shows the relationship between the virtual functions and the virtual tables may then be generated through static analysis of structure 200. In particular, Table 240 shows the valid hierarchical relationships between the virtual table pointers (which point to any one of virtual tables B-E and Base Class A) and the virtual function pointers contained within each virtual table. For example, a virtual table pointer B which points to virtual table B may in turn invoke a virtual function pointer m2 which causes a base function m2 that is contained in Base Class A to be called (as Table B is a descendant of Table A). All these valid relationships are illustrated in Table 240.

In embodiments of the disclosure, instead of storing the results of the static analysis of structure 200 as Table 240, compiler 110 instead stores the results of the static analysis of structure 200 as CHHT 125. CHHT 125 essentially comprises hashes of virtual table pointers with each of the virtual function pointers contained within a particular virtual table whereby the class associated with the virtual table pointer has a direct inheritance relationship with a base class that contains the base functions referenced by the respective virtual function pointers. Each of these hashes are then associated with a positive indicator.

For the example shown in FIG. 2, this means that the results of the static analysis are stored in CHHT 250 where CHHT 250 is generated based on the hierarchical relationships of the virtual tables and the base functions provided in the base class in structure 200. As Table B of Class B is a descendant of Base Class A, this implies that there is a direct inheritance relationship between these two classes and the same applies for Tables C, D, E with Base Class A as they each are a descendant of Base Class A and Tables D, E with Table C as they each are a descendant of Table C.

The virtual table pointers of these classes are then hashed with virtual function pointers contained within each of the respective virtual tables and the hashed results are then associated with an indicator such as, but not limited to, a positive indicator. In this example, the positive indicator is defined as the numeral "1" but one skilled in the art will recognize that other forms of positive indicators may be used without departing from this disclosure. In embodiments of the disclosure, the CHHT may be compressed further using bloom filter hash algorithms to reduce the overall size of the CHHT.

For example, a virtual table pointer to Table B is hashed with a virtual function pointer to m1 in Base Class A and the hash result is associated with a positive indicator "1". Similarly, a virtual table pointer to Table D is hashed with a virtual function pointer to m2 in Table C (which comprises a virtual function m2) and the hash result is associated with a positive indicator "1".

In another embodiment of the disclosure, equations 1(a) and 1(b) may be used to compute a total number of entries in the CHHT (i.e. "Total") whereby this Total number may be used to improve the security level of the CHHT. Based on the example in FIG. 2 and under the assumption that SP is defined as 100, equation 1(b) is to be utilized as SP>(n·m/log n), i.e. SP>(5·3/log 5). Hence, the Total is found to be 75. As obtained above, the number of entries in CHHT 250 with a positive indicator was found to be 21. Hence, 54 entries indexed by other random class relationships will be generated and associated with negative indicators before being randomly inserted between the existing rows in CHHT 250. In this example, the negative indicator may be defined as the numeral "0".

Returning to FIG. 1A, after the virtual table pointers to the virtual tables have been inserted into each class of source code 105 that has a virtual function by the compiler 110, a security check function will be associated with each virtual function invocation site in each class such that each associated security check function will be executed prior to the execution of the virtual function during the runtime of the binary file 120. The security check function may comprise a process to determine the class to which the virtual function belongs to, a process to check whether the virtual table referred to by the virtual table pointer is within the specified virtual table memory range and/or a process to check if the invocation is valid.

CHHT 125 is then generated by compiler 110 based on the static analysis of the class hierarchy of the classes in source code 105. The CHHT 125 and the virtual tables generated by compiler 110 may then utilized during the runtime of binary file 120.

Figure 1B:
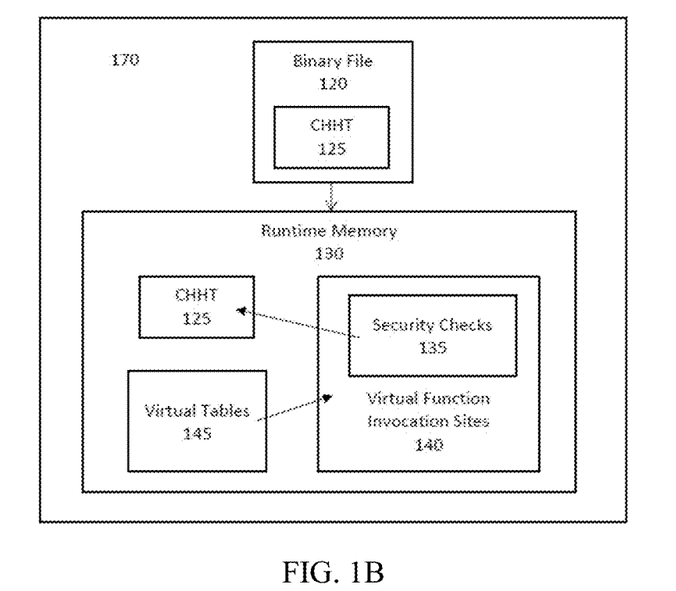
FIG. 1B illustrates an exemplary block diagram of a system representative of modules to support the execution of a binary file whereby the modules include a CHHT and security check functions that have been associated with virtual function invocation sites in accordance with embodiments of the disclosure.

In embodiments of the disclosure, with reference to FIG. 1B, the binary file 120 may be provided to another device, i.e. device 170, which will then execute the binary file accordingly. One skilled in the art will recognize that the binary file 120 may also be executed by device 100 without departing from this disclosure. When the binary file 120 is executed in device 170, the binary file will initially be loaded into the runtime memory 130 of device 170. During runtime of the file 120, when a virtual function is to be invoked, i.e. at a virtual function invocation site 140, a security check function 135 associated with the virtual function that is to be invoked will cause a virtual table pointer (that is pointing to one of virtual tables 145) associated with the class of the virtual function to be hashed with a virtual function pointer contained within the virtual table referenced by the virtual table pointer. The security check function 135 then determines if the hash result matches with a hash associated with an appropriate indicator in the CHHT 125 such as a positive indicator and if it does, the security check function 135 then validates the virtual table associated with the virtual function and allows the invocation of the virtual function.

For example, based on the example in FIG. 2, when virtual function m1 in Class B is called, the security check function associated with virtual function m1 causes a virtual table pointer to Table B (which contains the address of Table B or class 210) to be hashed with a virtual function pointer to m1 in Base Class A (which contains the base function m1). This hash result is then compared with the hashes in CHHT 250 to determine if the hash result matches with a hash associated with a positive indicator. As the hash of the address of Table B with a virtual function pointer m1 in Table B is associated with a positive indicator in CHHT 250, this implies that the virtual tables associated with function m1 are valid and function m1 may then be allowed to run as normal.

In embodiments of the disclosure, compiler 110 may compile binary file 120 in such a manner that when binary file 120 is loaded into the runtime memory 130 of a device, the virtual tables 145 and the CHHT 125 will be caused to be stored at certain sections of the runtime memory 130 that are protected. This is so that when binary file 120 is executed by device 170, the virtual tables 145 and CHHT 125 may only be located at the read only memory section of runtime memory 130. This is advantageous as it prevents potential attackers from modifying the values in CHHT 125 and/or virtual tables 145.

In other embodiments of the disclosure, compiler 110 may also compile binary file 120 such that addresses of virtual tables generated during the compilation process are relocated into a specific memory range such that when the binary file 120 is loaded into the process memory of runtime memory 130, the addresses of virtual tables 145 are in a sequential order or continual series of addresses. This specific memory range enables the ranges of addresses belonging to virtual tables 145 to be easily verified as required.

In accordance with embodiments of the disclosure, a method for a device generate a CHHT based on one or more classes that are linked in a source code whereby the CHHT is used together with security check functions that are associated with virtual functions to validate invoked virtual function pointers, comprises the device carrying out the following steps:

Step 1: Compiling a source code file, the source code file comprising one or more classes that are linked whereby at least one of the classes has at least one virtual function.

Step 2: The compiling comprises the following steps.

Sub-step (a): Associating, for each class that has at least one virtual function, a security check function with each virtual function invocation site in the class such that the associated security check function is executed prior to an invocation of the virtual function.

Sub-step (b): Generating a CHHT based on the linked one or more classes whereby the generating comprises the following steps.

Sub-step (b)(i): Hashing, for each class that has an associated virtual table, an address of the associated virtual table with each virtual function pointer contained in the associated virtual table to produce a hash result for each of the virtual function pointers and associating each of the hash results with an indicator.

Sub-step (b)(ii): Populating the CHHT with the hash results and their associated indicators.

In order to provide such a method, processes are needed for configuring the device to validate virtual tables of a software application. The following description and FIG. 3 and FIG. 4 describe embodiments of processes that provide the necessary steps in accordance with this disclosure.

Figure 3:
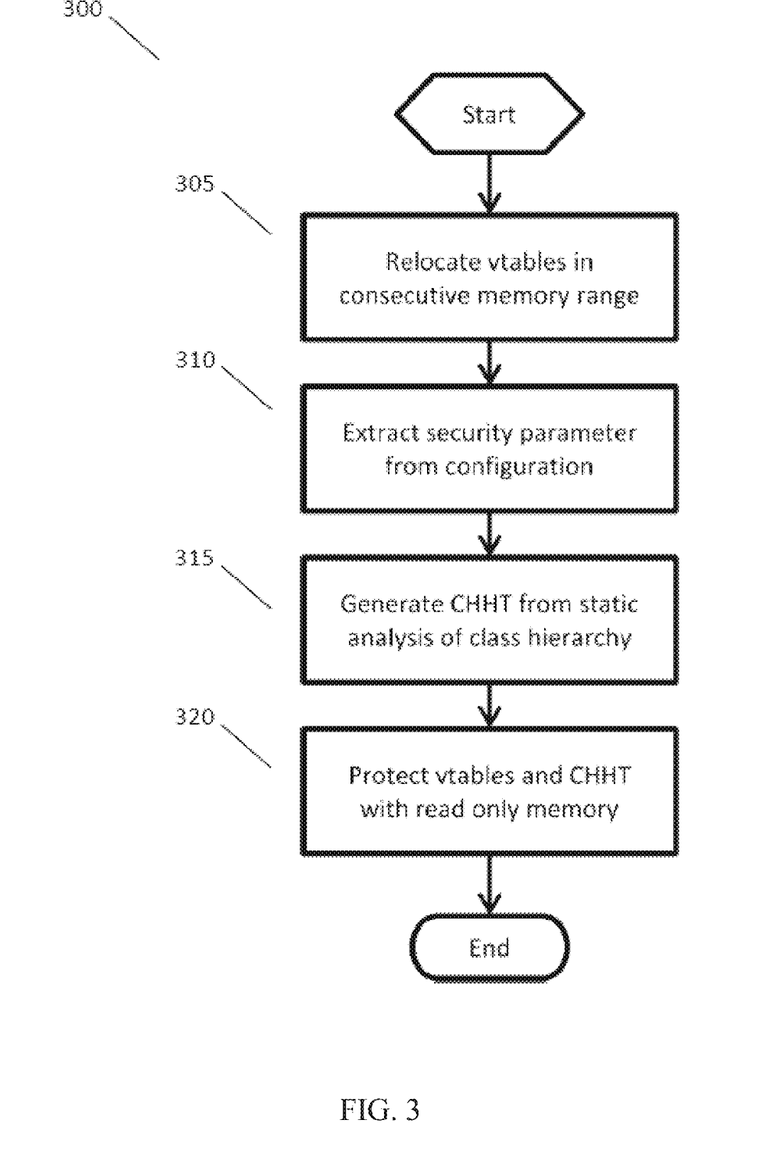
FIG. 3 illustrates a flow diagram showing a process that is performed by a device during runtime of a source code that has been compiled in accordance with embodiments of the disclosure.

FIG. 3 illustrates process 300 that is performed by a device during the compilation of a source code in accordance with embodiments of the disclosure. Process 300 begins when the source code is being compiled and may begin at step 305, 310 or 315. When process 300 begins at step 315, process 300 will cause CHHT to be generated based on the static analysis of class hierarchy of classes having direction inheritance relationships. Process 300 may then perform all the other typical compilation steps and end or process 300 may proceed to step 320 whereby generated virtual tables and the CHHT are stored within the read only memory in the binary file. When process 300 begins at step 305, process 300 will cause virtual tables generated during the compilation step to be stored in a consecutive memory range. Process 300 may then proceed to step 310 or step 315. At step 310, process 300 will extract the security parameters from the source code and will utilize the security parameters to randomize the entries in the CHHT to increase the security level of the CHHT. Process 300 may perform all of steps 305-320 or may select to perform any combination of step 315 with steps 305, 310, and/or 320 without departing from the disclosure. Process 300 then ends.

Figure 4:
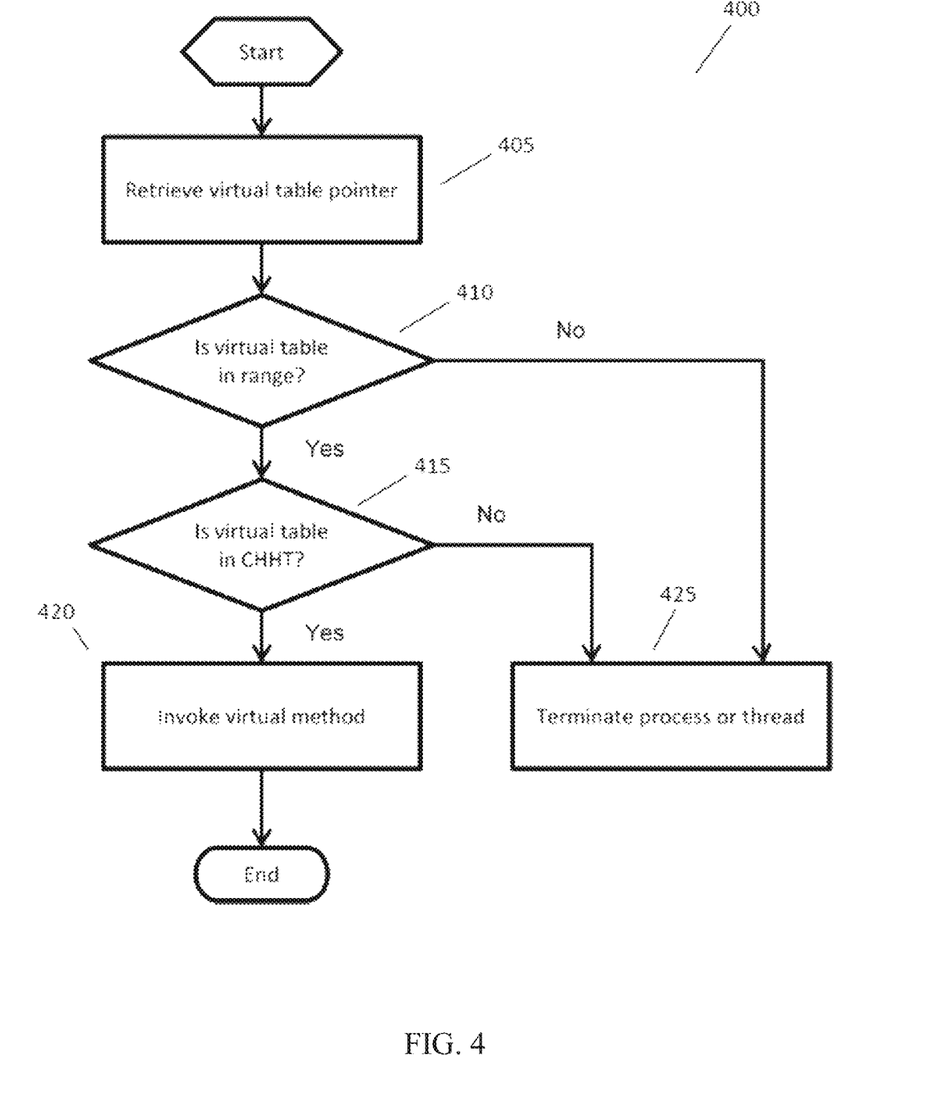
FIG. 4 illustrates a flow diagram showing a process that is performed by a device during compilation of a source code to generate a CHHT in accordance with embodiments of the disclosure.

FIG. 4 illustrates process 400 that is performed by a device during runtime of a source code that has been compiled in accordance with embodiments of the disclosure. Process 400 begins when a security check function associated with a virtual function has been invoked. Process 400 begins at step 405 by retrieving the relevant virtual table pointer that is associated with the virtual function to be invoked. Process 400 may then perform two checks, i.e. steps 410 and 415, or process 400 may only perform step 415, thereby bypassing step 410. If two checks are to be performed, process 400 will proceed to step 410 whereby process 400 will determine if the virtual table pointer is pointing to an address that is contained within a specific range. If process 400 determines that the address of the virtual table is not within the specific range, process 400 will proceed to step 425 whereby process 400 will then terminate and end.

Conversely, if process 400 determines that the address of the virtual table is within the specific range, process 400 will then proceed to the next validation step at step 415. At this step, process 400 will determine if the hash of the address of the virtual table with the relevant virtual function pointer (which points to the virtual function that is to be invoked) is a match with a hash having a positive indicator as found in the CHHT. If process 400 determines that the hash results do not match, process 400 will proceed to step 425 whereby process 400 will then terminate and end. Conversely, if the hash result matches with a hash having a positive indicator in the CHHT, process 400 proceeds to step 420 and causes the virtual function to be invoked. Process 400 then ends.

Figure 5:
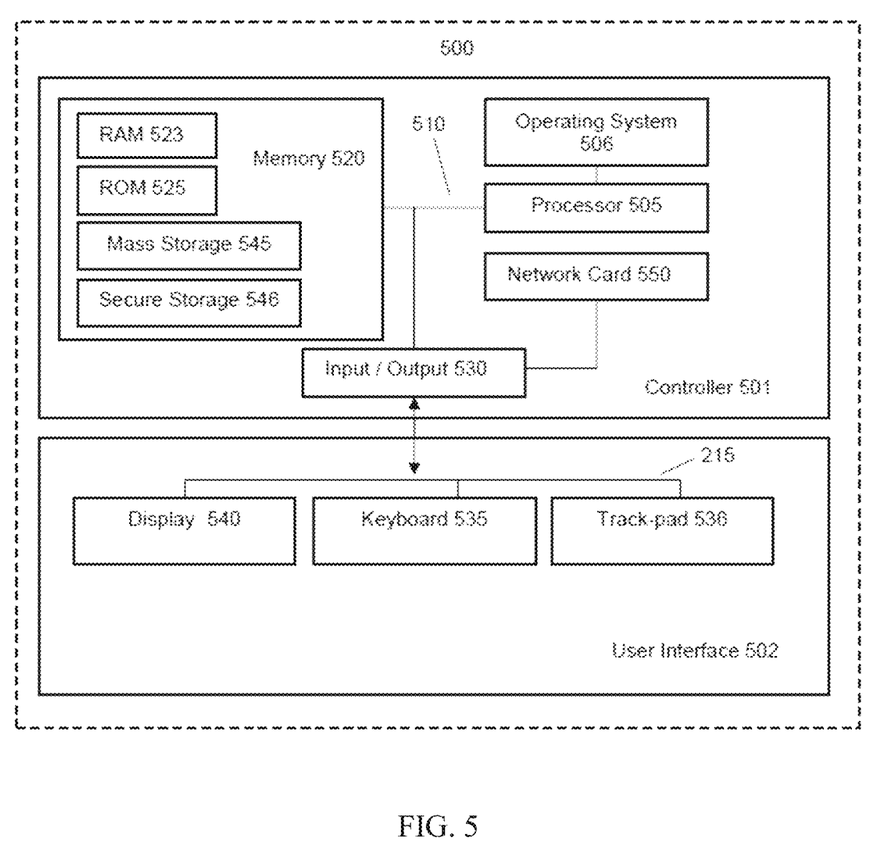
FIG. 5 illustrates a block diagram representative of components in an electronic device for implementing embodiments in accordance with embodiments of the disclosure.

FIG. 5 illustrates a block diagram representative of components of module 500 that may be provided within device 100 for implementing embodiments in accordance with embodiments of the disclosure. One skilled in the art will recognize that the exact configuration of each wireless device provided within the devices or the access point may be different and the exact configuration of module 500 may vary and FIG. 5 is provided by way of example only.

In embodiments of the disclosure, module 500 comprises controller 501 and user interface 502. User interface 502 is arranged to enable manual interactions between a user and module 500 and for this purpose includes the input/output components required for the user to enter instructions to control module 500. A person skilled in the art will recognize that components of user interface 502 may vary from embodiment to embodiment but will typically include one or more of display 540, keyboard 535 and track-pad 536.

Controller 501 is in data communication with user interface 502 via bus 515 and includes memory 520, processor 505 mounted on a circuit board that processes instructions and data for performing the method of this embodiment, an operating system 506, an input/output (I/O) interface 530 for communicating with user interface 502 and a communications interface, in this embodiment in the form of a network card 550. Network card 550 may, for example, be utilized to send data from electronic device 500 via a wired or wireless network to other processing devices or to receive data via the wired or wireless network. Wireless networks that may be utilized by network card 550 include, but are not limited to, WI-FI, BLUETOOTH, Near-Field Communication (NFC), cellular networks, satellite networks, telecommunication networks, WANs, etc.

Memory 520 and operating system 506 are in data communication with a central processing unit (CPU) 505 via bus 510. The memory components include both volatile and non-volatile memory and more than one of each type of memory, including random-access memory (RAM) 520, read-only memory (ROM) 525 and a mass storage device 545, the last comprising one or more solid-state drives (SSDs) or any other types of drives. Memory 520 also includes secure storage 546 for securely storing secure data. It should be noted that the contents within secure storage 546 might only be accessible by a super-user or administrator of module 500 and might not be accessed by any user of module 500. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 520 may include a kernel and/or programming modules such as a software application that may be stored in either volatile or non-volatile memory.

Herein the term "processor" is used to refer generically to any device or component that can process such instructions and may include a microprocessor, microcontroller, programmable logic device or other computational device. That is, processor 505 may be provided by any suitable logic circuitry for receiving inputs, processing them in accordance with instructions stored in memory and generating outputs (for example to the memory components or on display 540). In this embodiment, processor 505 may be a single core or multi-core processor with memory addressable space. In one example, processor 505 may be multi-core, comprising—for example—an 8 core CPU.

The above is a description of embodiments of a device and is set forth in the following claims. It is envisioned that others may and will design alternatives that fall within the scope of the following claims.

The invention claimed is:

1. A device comprising:
a memory configured to store instructions; and
a processor coupled to the memory, wherein the instructions cause the processor to be configured to:
   compile a source code file comprising:
      one or more classes, wherein each of the one or more classes comprises a first virtual table comprising at least one virtual function pointer pointing to a first virtual function; and
      a virtual function invocation site associated with a second virtual function in one of the one or more classes,
   wherein in a manner to compile the source code file, the instructions further cause the processor to be configured to:
      associate a first security check function with the virtual function invocation site to execute the first security check function prior to an invocation of the second virtual function;
      generate a class hierarchy hash table (CHHT) by:
         hashing, for each of the one or more classes, a first address of the first virtual table with each of the at least one virtual function pointer to produce a first hash result for each of the at least one viral function pointer;
         associating the first hash result with a first indicator, and
         populating the CHHT with the first hash result and the first indicator; and
      determine, using the first security check function whether a first virtual function pointer of the second virtual function is valid by looking up a second indicator in the CHHT according to a second hash result of the first virtual function pointer and a second address of a second virtual table comprising the first virtual function pointer.

2. The device of claim 1, wherein before hashing the first address with each of the at least one virtual function pointer and associating the first hash result with the first indicator, the instruction further cause the processor to be configured to:
   compute a total number of entries in the CHHT, wherein the total number of entries is based on a total number of the one or more classes, an average number of virtual functions in the one or more classes, and a security parameter (SP) of the one or more classes; and
   populate the CHHT with initial hashes and initial indicators.

3. The device of claim 2, wherein SP is based on security consumption of the CHHT and space consumption of the CHHT.

4. The device of claim 1, wherein the instructions further cause the processor to relocate the first address and the second addresses to a memory range.

5. The device of claim 4, wherein the instructions further cause the processor to be configured to determine, using each of second security check functions, whether a second virtual function pointer of a third virtual function associated with each of the second security check functions is valid by comparing a third address of a third virtual table comprising an invoked virtual function pointer with the first address and the second address.

6. The device of claim 1, wherein the instructions further cause the processor to be configured store the first virtual table, the second virtual table, and the CHHT in a protected non-transitory readable by the processor.

7. A method comprising:
compiling a source code file comprising:
one or more classes, wherein each of the one or more classes comprises a first virtual table comprising at least one virtual function pointer pointing to a first virtual function; and
a virtual function invocation site associated with a second virtual function in one of the one or more classes,
wherein compiling the source code file comprises:
associating a first security check function with the virtual function invocation site to execute the first security check function prior to an invocation of the second virtual function;
generating a class hierarchy hash table (CHHT) by:
hashing, for each of the one or more classes, a first address of the first virtual table with each of the at least one virtual function pointer to produce a first hash result for each of the at least one virtual function pointer,
associating the first hash result with a first indicator; and
populating the CHHT with the first hash result and the first indicator; and
determining using the first security check function, whether a first virtual function pointer of the second virtual function is valid by looking up a second indicator in the CHHT according to a second hash result of the first virtual function pointer and a second address of a second virtual table comprising the first virtual function pointer.

8. The method of claim 7, wherein before hashing the first address with each of the at least one virtual function pointer and associating the first hash result with the first indicator, the method further comprises:
computing a total number of entries in the CHHT, wherein the total number of entries is based on a total number of the one or more classes, an average number of virtual functions in the one or more classes, and a security parameter (SP) of the one or more classes; and
populating the CHHT with initial hashes and initial indicators.

9. The method of claim 8, wherein SP is based on security consumption of the CHHT and space consumption of the CHHT.

10. The method of claim 7, further comprising relocating the first address and the second address to a memory range.

11. The method of claim 10, further comprising determining, using each of second security check functions, whether a second viral function pointer of a third virtual function associated with each of the second security check functions is valid by comparing a third address of a third virtual table comprising an invoked virtual function pointer with the first address and the second address.

12. The method of claim 7, further comprising storing the first virtual table, the second virtual table, and the CHHT in a protected non-transitory.

13. A device comprising:
a memory configured to store instructions comprising one or more classes, wherein each of the one or more classes comprises a first virtual table comprising at least one virtual function pointer pointing to a first virtual function; and
a processor coupled to the memory, wherein the instructions cause the processor to be configured to:
detect a virtual function invocation site associated with a second virtual function in one of the one or more classes;
hash, for each of the one or more classes, a first address of the first virtual table with each of the at least one virtual function pointer to produce a first hash result for each of the at least one virtual function pointer;
associate the first hash result with a first indicator; and
execute a security check function to determine whether a first virtual function pointer of the second virtual function is valid by looking up a second indicator in a class hierarchy hash table (CHHT) according to a second hash result of the first virtual function pointer and a second address of a second virtual table comprising the first virtual function pointer, wherein the CHHT comprises the first hash result and the first indicator.

14. The device of claim 13, wherein the instructions further cause the processor to be configured to relocate the first address and the second address to a memory range.

15. The device of claim 14, wherein the instructions further cause the processor to be configured to determine, using each of second security check functions, whether a second virtual function pointer of a third virtual function associated with each of the second security check functions is valid by comparing a third address of a third virtual table comprising the second virtual function pointer with the first address and the second address.

16. The device of claim 13, wherein the instructions further cause the processor to be configured to store the first virtual table, the second virtual table, and the CHHT in a protected non-transitory medium readable by the processor.

17. A method comprising:
detecting a virtual function invocation site associated with a first virtual function in a compiled file, wherein the compiled file comprise one or more classes, wherein each of the one or more classes comprises a first virtual table comprising at least one virtual function pointer pointing to a second virtual function;
hashing, for each of the one or more classes, a first address of the first virtual table with each of the at least one virtual function pointer to produce a first hash result for each of the at least one virtual function pointer;
associate the first hash result with a first indicator; and
executing a security check function to determine whether a first virtual function pointer of the first virtual function is valid by looking up a second indicator in a class hierarchy hash Table (CHHT) according to a second hash result of the first virtual function pointer and a second address of a second virtual table comprising the first virtual function pointer, wherein the CHHT comprises the first hash result and the first indicator.

18. The method of claim 17, further comprising relocating the first address and second address to a memory range.

19. The method of claim 18, further comprising determining, using each of second security check functions, whether a second virtual function pointer of a third virtual function associated with each of the second security check functions is valid by comparing a third address of a third virtual table comprising the second virtual function pointer with the first address and the second address.

20. The method of claim 17, further comprising storing the first virtual table, the second virtual table, and the CHHT in a protected non-transitory medium.

* * * * *

UNITED STATES PATENT AND TRADEMARK OFFICE
CERTIFICATE OF CORRECTION

PATENT NO. : 11,755,723 B2
APPLICATION NO. : 17/237388
DATED : September 12, 2023
INVENTOR(S) : Ting Dai, Yongzheng Wu and Tieyan Li It is certified that error appears in the above-identified patent and that said Letters Patent is hereby corrected as shown below:

In the Claims

Column 14, Line 54, Claim 4 should read:
The device of claim 1, wherein the instructions further cause the processor to be configured to relocate the first address and the second address to a memory range.

Column 14, Lines 65-67, Claim 6 should read:
The device of claim 1, wherein the instructions further cause the processor to be configured to store the first virtual table, the second virtual table, and the CHHT in a protected non-transitory medium readable by the processor.

Column 16, Line 38, Claim 17 should read:
compiled file comprises one or more classes, wherein Column 16, Line 56, Claim 18 should read:
the first address and the second address to a memory range.

Signed and Sealed this
Twenty-fourth Day of October, 2023

Katherine Kelly Vidal
*Director of the United States Patent and Trademark Office*